J. G. TALLMAN.
PIPE COUPLING.
APPLICATION FILED JAN. 4, 1918.

1,282,491.

Patented Oct. 22, 1918.

INVENTOR
Joseph G. Tallman
BY Wiedersheim & Fairbanks
ATTORNEYS

UNITED STATES PATENT OFFICE.

JOSEPH G. TALLMAN, OF PHILADELPHIA, PENNSYLVANIA.

PIPE-COUPLING.

1,282,491.
Specification of Letters Patent.
Patented Oct. 22, 1918.

Application filed January 4, 1918. Serial No. 210,399.

*To all whom it may concern:*

Be it known that I, JOSEPH G. TALLMAN, a citizen of the United States, residing in the city and county of Philadelphia, State of Pennsylvania, have invented a new and useful Pipe-Coupling, of which the following is a specification.

My invention consists of a pipe coupling composed of a pair of thimbles or sleeves tapered respectively on the interior and exterior surfaces thereof, the inner thimble being split or divided in longitudinal direction and being adapted to be contracted by the outer thimble, whereby the inner sleeve may be compressed upon the opposite pipes to be coupled, a stop member being made also on the inner thimble for spacing said sections whereby in assembling the latter they are adapted to be properly seated relatively to each other, and prevented from direct pressure on each other.

The invention is satisfactorily illustrated in the accompanying drawing but the important instrumentalities thereof may be varied, and so it is to be understood that the invention is not limited to the specific details shown and described, as long as they are within the spirit or scope of the claims.

Similar numerals of reference indicate corresponding parts in the figures.

Figure 1:
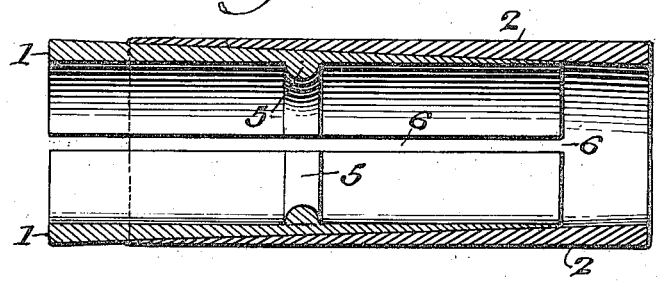
Figure 1 represents a longitudinal section of a pipe coupling embodying my invention.

Referring to the drawings.

1 and 2 designate opposite sections of the coupling, the same being of the form of thimbles or sleeves, the inner thimble 1 being tapered on its exterior surface, and the outer thimble 2 being tapered on its interior surface, said surfaces being adapted to be placed in contact allowing the thimbles to be slidable telescopically on each other in the longitudinal direction thereof by a slip joint so that the outer thimble may be driven over the inner thimble and tightly engage the same.

The interior surface of the inner thimble is cylindrical in accord with the outer surfaces of the opposite end portions of the pipes 3 and 4 to be coupled and so snugly hug the latter throughout the contiguous surface.

On the inner surface of the inner thimble is the bead or nurl 5 which extends in the circumferential direction of the thimble and projects inwardly from said surface so as to form a well defined shoulder in the bore of the thimble intermediate of the ends thereof, and consequently between the ends of the pieces of pipe when introduced into the coupling.

The inner thimble is split or divided in its longitudinal direction as at 6, and continued through the nurl in register with the division of the thimble so that the latter may contract and expand uniformly through the entire length of the thimble without resistance of said nurl. The terminals of the divisions are formed respectively with the tongue 7 and the bevel face 8 the former being adapted to overlap freely the other in the primary condition of said thimble, thus partially closing the joint formed by said division, said bevel face and tongue being subsequently slidable on each other as will be hereinafter again referred to.

The operation is as follows:—

Figure 2:
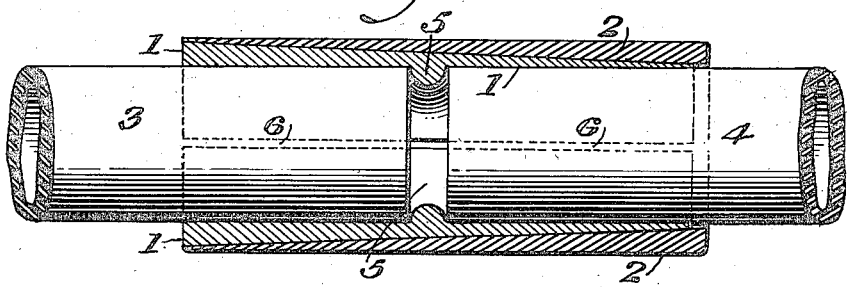
Fig. 2 represents a similar section showing also opposite pieces of pipe coupled therein.
Figure 3:
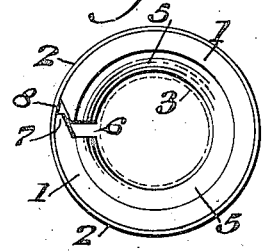
Fig. 3 represents an end view of the coupling.
Figure 4:
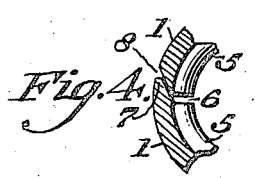
Fig. 4 represents a diametrical section of a portion of the inner thimble employed.

The thimbles are fitted to each other telescopically, and then placed over one of the pipes say the pipe 3 limited by the nurl 5 contacting with the inner end of said pipe, said pipe being located at a place of service. Then the opposite pipe, say the pipe 4, is introduced into the coupling to the extent limited by its inner end abutting the nurl, thus setting said pipe 4 in position at its place of service. The thimble 2 is now driven over the thimble in the direction, in the present case, to the left, as indicated by the arrow Fig. 2, when said thimble 2 is contracted and so closed upon both pipes and compressed thereagainst causing both pipes to be clamped tightly by the coupling.

When the pipe 4 contacts with the nurl 5 it is known to the workman that said pipe is in proper position, and so no further advance of the pipe is needed, and said pipe will not be forced against the end of the pipe 3 and displace or disturb the latter.

When the inner thimble is contracted and the terminals thereof at the division 6 approach each other, the space existing between said terminals is reduced. Then the tongue 7 rides slidably on the bevel face 8 or vice versa and so closes the joint formed by said division, preserving in the main the continuity of the circumference of said inner thimble 1, and causing a uniform pressure of the thimble on the pipes 3 and 4.

The nurl serves also to hold the inner thimble in place while seated on the end of the pipe 3, and so the outer ferrule can be driven over said inner thimble in tightening the coupling without shifting said inner thimble, said nurl being preferably equidistant from the end of said inner thimble so as to center the latter on the terminal portions of the opposite pipes 3 and 4.

I have used the term thimble to express the members, but it is evident that they may be designated as collars, sleeves, ferrules, or the like, without affecting the operation of the device. The term nurl is the equivalent of bead, either accomplishing the same result.

The coupling will be found to be admirably adapted for pipes containing articles such as electric wires or conductors, and so made of light, but strong metal, steel being preferred.

Having thus described my invention, what I claim as new and desire to secure by Letters Patent, is:—

1. A coupling of the character stated formed of an inner thimble having its interior surface of cylindrical form, and its exterior surface of tapering form, and an outer thimble having its interior surface of tapering form to fit the exterior surface of the inner thimble, an inwardly projecting nurl on the interior surface of the inner thimble, said interior thimble being divided through its length, said nurl being also divided through its length in register with the division of said thimble.

2. A coupling of the character stated formed of an inner thimble having its interior surface of cylindrical form, and its exterior surface of tapering form, and an outer thimble having its interior surface of tapering form to fit the exterior surface of the inner thimble, an inwardly projecting nurl on the interior surface of the inner thimble, said interior thimble being divided through its length, said nurl being also divided through its length in register with the division of said thimble, the opposite terminals of the walls of the division of the inner thimble being formed respectively with an overlapping tongue and a bevel face for the latter.

JOSEPH G. TALLMAN.

Witnesses:
JOHN A. WIEDERSHEIM,
N. BUSSINGER.